Patented Oct. 9, 1928.

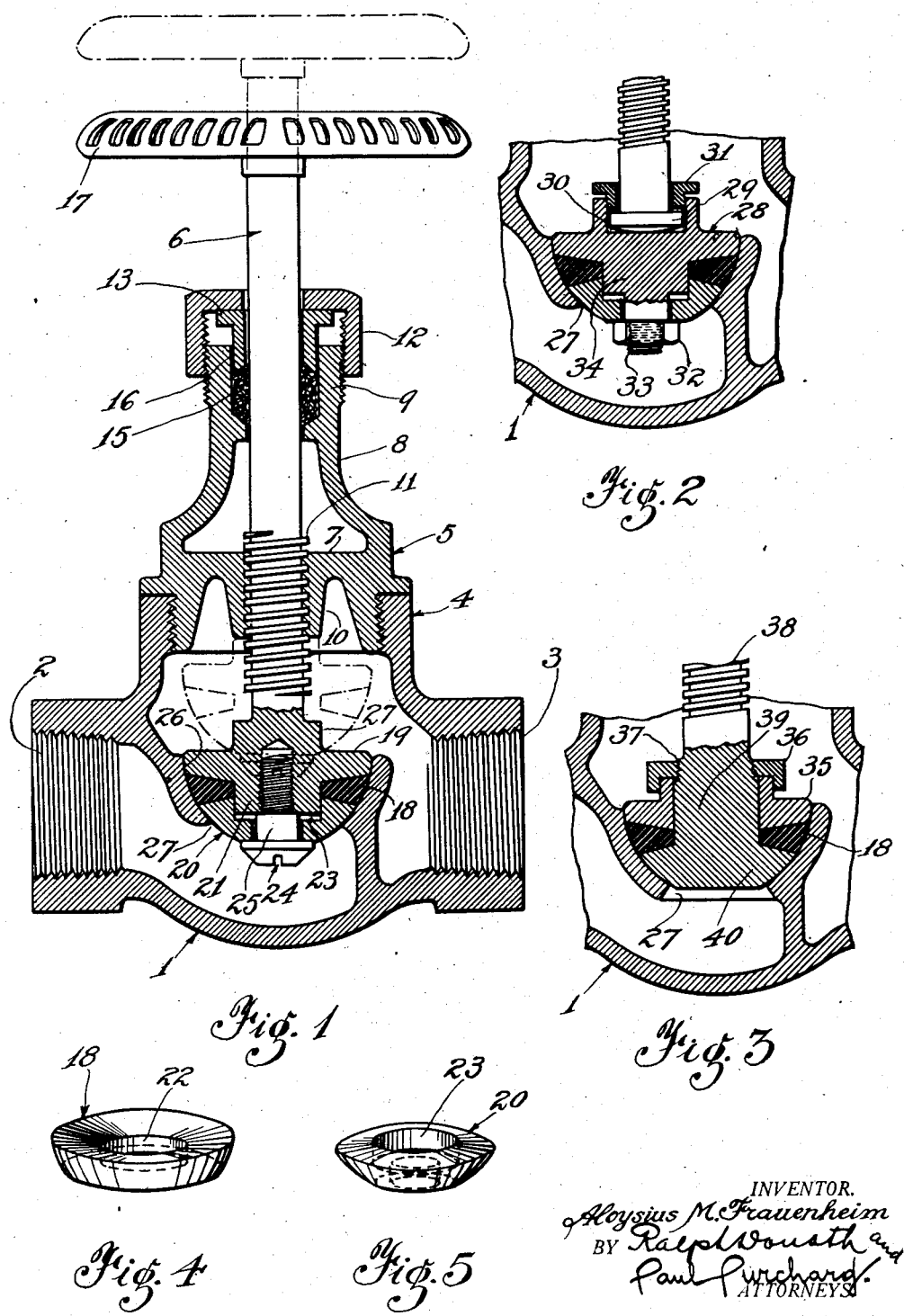

1,686,849

UNITED STATES PATENT OFFICE.

ALOYSIUS M. FRAUENHEIM, OF PITTSBURGH, PENNSYLVANIA.

FLUID VALVE.

Application filed October 15, 1927. Serial No. 226,273.

This invention relates to valves for fluids and more in particular to the type of valves known in the trade as globe-valves.

One of the primary objects of this invention is to provide a composite valve disc composed of a resilient disc-member placed intermediate two disc-members made of hard, unyielding material, preferably of metal, said disc-members being properly machined to jointly fit accurately within the seat of the valve. Another object is to provide a composite valve disc of the above stated type having the shape of a spherical zone adapted to fit a correspondingly shaped seat, so that said disc may adjust itself properly within the seat. A further object is to provide a valve disc in which the most vulnerable part, represented by the resilient disc-member is entirely enclosed in the valve seat, when the valve is shut, whereby said disc-member is protected against corrosion or other detrimental action which may be caused by the nature of the fluid controlled thereby. Still another object of this invention is the provision of such a composite valve disc in which the sealing action of the resilient disc-member is due not solely to the direct pressure by said member on the valve-seat, but in addition by a radial outward pressure on said seat caused by the wedge-effect produced by the beveled contacting faces of the two component rigid disc-members between which the resilient disc-member is placed. Additional features and advantages of this invention will appear from the following description considered in connection with the accompanying drawing, forming a part of this application and in which:

Fig. 1 is a sectional elevation of a valve constructed according to my invention, some parts being shown in elevation.

Fig. 2 is a fragmentary sectional view showing a modification of the invention.

Fig. 3 is a fragmentary sectional view depicting another modified construction.

Fig. 4 is a perspective view of the resilient disc-member used in either one of the constructions shown.

Fig. 5 is a perspective view of the follower used in a valve built according to Figs. 1 or 2.

Reference being had to the drawing, a valve built in accord with my invention follows in its outward appearance the usual construction used for globe-valves and consists of a body 1 having inlet and outlet connections 2 and 3 and an interiorly threaded neck 4 to which is screwed the valve bonnet 5. The latter serves as a support and guide for the valve-stem 6 and comprises the base portion 7, the neck 8 and the stuffing-box 9. The base has a hub 10 which is centrally threaded to accommodate the threads 11 of the valve-stem, whereas the stuffing box 9 is of usual design and consists of the screwed on cap 12 and the gland 13, which presses upon the packing-material 15 placed around the smooth part of the valve-stem in a suitable recess 16 provided in the top of the bonnet. The valve-stem is surmounted with any desired and suitable type of operating means, such as the hand-wheel 17.

The control of the fluid passing through the valve-body 1 is effected by means of a new type of composite valve-disc, the construction of which forms the subject matter of this application.

In the construction shown in Fig. 1 in particular, the valve-disc used therein consists of an annular gasket 18 made of resilient material, such as rubber of a composition suited to the nature and working pressure of the fluid controlled. This gasket is placed between a stationary disc 19, which in this example is formed integrally with the valve stem, and the follower-disc 20. Upon its underside the stationary disc has an extension, or core, 21 which fits closely within the central aperture 22 of the gasket, and which also acts as a guide for the follower by engaging the recess 23 disposed centrally therein. The component parts of this composite valve-disc are held together by means of a screw 24 having an enlarged shank portion 25 to limit the amount the screw may be screwed in and thereby the original pressure of the follower on the gasket. This composite valve-disc is shaped like a spherical zone and fits within a correspondingly shaped valve seat 26, the lower portion of the follower serving as a seal for the port aperture 27.

The so-called flat sides of the gasket 18 may be made level, if desired, but in practice I prefer to make them dished, as shown in the various figures, so that the gasket will be thickest at the spherically shaped periphery. The faces of the stationary disc 19 and of the follower-disc 20 contacting with the gasket are, of course, suitably beveled to fit within the dished gasket. The advantage of this construction is that when the valve-disc is forced on its seat, the sealing action of the gasket due to the vertical pressure will be increased by the wedge-effect of the beveled disc-members, which effects tends to squeeze the material of the gasket outwardly against the seat, as will be readily understood. If desired, the rigid disc 19 may be provided with a collar 27 which not only strengthens the connection between the valve-stem and disc, but also serves to stop the upward travel of the valve to the limit shown in dot and dash lines, by striking against the underside of the hub 10.

The modified valve disc shown in Fig. 2 differs from the one above described in that the upper rigid disc-member 28 is not formed integrally with the valve-stem, but is swivelly connected thereto. In the arrangement shown, the lower end of the valve-stem is provided with a flange 29 loosely engaging an inwardly threaded circular recess 30 in which an annular nut 31 is screwed. This construction, of course, permits of slight axial adjustments of the disc and of the rotation of the valve-stem without rotating the composite valve-disc, when the latter is seated, thus eliminating the wear of said valve-disc and the seat therefor due to improper seating or grinding. The three component discs of the valve-disc are held together by a nut 32 which is applied to a suitably threaded extension 33 formed integrally with the upper disc-member and depending from the core 34 thereof.

In Fig. 3 the sealing action of the gasket 18 is not obtained by forcing down the valve-stem, but depends entirely on the hydrostatic pressure exerted by the controlled fluid. In this construction the follower disc 35 is located above the gasket 18 and is held in place by a flanged nut 36 which engages the threaded portion 37 of the valve-stem 38. The latter is extended downward to produce the core 39 and the spherically turned head 40 which forms the lower and stationary disc element of the composite valve-disc. The latter has, as in the other constructions, the shape of a spherical zone. As will be noted, the harder the valve-stem is screwed down, the greater will be the pressure of the lower disc-member 40 on the valve seat. It will also be seen that the nut 36, once adjusted, prevents upward movement of the follower disc 35 and that the latter bears down upon the gaskets under the influence of the fluid pressure so that, the greater said pressure, the greater will also be the sealing action of the gasket on the seat.

A valve built along the lines described offers a very great seating area for the valve disc, thus greatly prolonging the useful life of the latter. Moreover, it will be observed that the resilient gasket 18, which is usually more subject to wear or disintegration than the metal parts of the valve, forms only a fractional part of the thickness of the valve-disc and is at all times well protected within the seat, when the valve is closed. Another advantage of this construction lies in the fact that said gasket never comes in contact with the relatively sharp edges of the valve seat, thus, any cutting of the gasket is prevented.

Because of its protected position, the gasket will last considerably longer than gaskets of similar material exposed to the fluid when the valve is shut. Moreover, any considerable pressure imposed upon the gasket will simply compact the material thereof and reduce somewhat its thickness, but the active periphery of the gasket will always remain in proper sealing condition. Furthermore, the hardening of the gasket, through compacting, will never exceed the hardness of the other metallic parts of the valve; hence, the gasket will always yield sufficiently to produce a satisfactory seal, even though the metallic discs and the seat should become badly worn through extensive use or chemical actions. As will be apparent to those versed in the art, a worn gasket may easily be replaced by a new one, by simply unscrewing the screw or nut holding the component parts of the valve-disc together.

Although in the drawing I have shown applications of the spherical composite valve disc to straight globe-valves, it is evident that this type of disc can be used advantageously on angle body valves, check valves and other types of valves in which ordinary valve-discs have been used heretofore.

While the illustrated examples constitute practical embodiments of my invention, I do not wish to limit myself strictly to the mechanical details herein illustrated, since manifestly the same can be varied without departing from the scope of the invention, as defined in the appended claims.

I claim:

1. In a valve of the character described, a composite valve-disc having the shape of a spherical zone and a spherically shaped seat therefor, said composite disc comprising two rigid disc-members and an intermediate resilient disc-member, each adapted for sealing engagement with said seat when the valve is shut.

2. In a valve of the character described, a composite valve-disc having the shape of a spherical zone and a spherically shaped seat therefor, said composite disc comprising two rigid disc-members and an intermediate resilient disc-member severally adapted for sealing engagement with the seat when the valve is shut; and guide-means for holding the disc-members in proper alignment.

3. In a valve of the character described, a composite valve-disc having the shape of a spherical zone and a spherically shaped seat therefor, said composite disc comprising two rigid disc-members and an intermediate resilient disc-member severally adapted for sealing engagement with the seat when the valve is shut, and means for holding said disc-members together.

4. In a valve of the character described, a composite valve-disc having the shape of a spherical zone and a spherically shaped seat therefor, said composite disc comprising two rigid disc-members and an intermediate resilient disc-member severally adapted for sealing engagement with the seat when the valve is shut, and means for compressing the resilient disc-member between said rigid disc-members.

5. In a valve of the character described, a composite valve-disc having the shape of a spherical zone and a spherically shaped seat therefor, said composite disc comprising two rigid disc-members and an intermediate resilient disc-member severally adapted for sealing engagement with the seat when the valve is shut, and adjustable means for compressing the resilient disc-member between said rigid disc-members.

6. In a valve of the character described, a composite valve-disc having the shape of a spherical zone and a spherically shaped seat therefor, said composite disc comprising two rigid disc-members and an intermediate resilient disc-member severally adapted for sealing engagement with the seat when the valve is shut, and unitary means for holding said disc-members together and compressing said resilient disc-member.

7. In a valve of the character described, a composite valve-disc having the shape of a spherical zone and a spherically shaped seat therefor, said composite disc comprising two rigid disc-members and an intermediate resilient disc-member having dished sides in contact with the rigid disc-members, each disc-member being adapted for sealing engagement with said seat when the valve is shut.

8. In a valve of the character described, a composite valve-disc having the shape of a spherical zone and a spherically shaped seat therefor, said composite disc comprising two rigid disc-members and an intermediate resilient disc-member severally adapted for sealing engagement with said seat when the valve is shut, one of the rigid disc-members being movable along the axis of the other rigid disc-member, and means for holding said disc-members in proper alignment.

In testimony whereof I affix my signature.

ALOYSIUS M. FRAUENHEIM.